Feb. 10, 1942.  C. G. HUBBELL  2,272,561
MINNOW BUCKET
Filed June 9, 1941

C. G. Hubbell
INVENTOR.

Patented Feb. 10, 1942

2,272,561

UNITED STATES PATENT OFFICE 2,272,561

MINNOW BUCKET

Calvin Glenn Hubbell, Rankin, Ill.

Application June 9, 1941, Serial No. 397,318

5 Claims. (Cl. 43—56)

This invention relates to minnow buckets, and more particularly to buckets designed for containing live minnows or other small bait fish and designed primarily for keeping the minnows or bait alive for long periods of time, during warm weather.

An important object of the invention is to provide a minnow bucket of this character having an ice compartment for maintaining the water in which the minnows or bait are confined, cool, and at the same time gradually aerate the water, by supplying ice water to the water containing the bait, at a time when the oxygen is being exhausted.

A further object of the invention is the provision of a live bait bucket of this character wherein the ice compartment is constructed in such a way that the size and shape of the bait bucket will not be materially changed, and will not render the bucket bulky and may be carried in perfect balance.

Still another object of the invention is to provide a bait bucket wherein the cover thereof will act to close both the ice compartment and main compartment of the bucket, to facilitate filling the bucket.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing.

Figure 1:
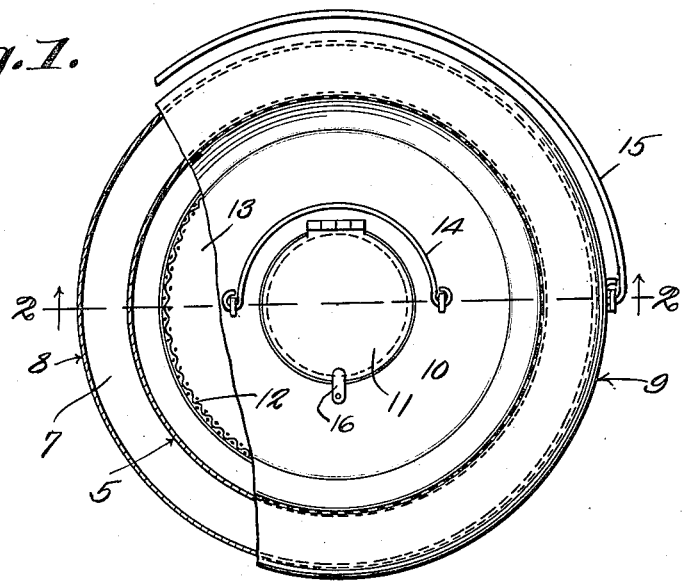
Figure 1 is a plan view of a bait bucket constructed in accordance with the invention, a portion of the cover thereof having been broken away to illustrate the ice compartment.
Figure 2:
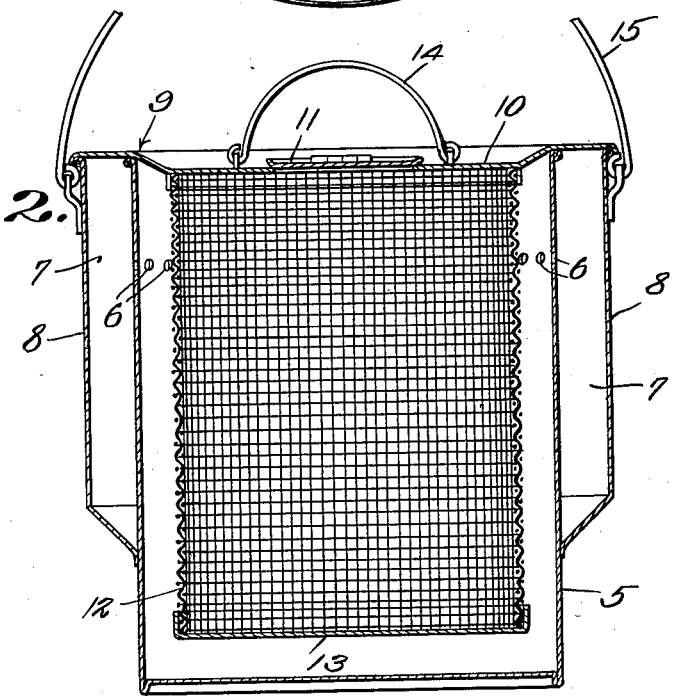
Figure 2 is a sectional view taken on line 2—2 of Figure 1.

Referring to the drawing in detail, the minnow bucket comprises the main bucket section 5 which is preferably circular in formation, however the general shape of the bucket may be varied to meet the requirements of use.

Arranged in the wall of the main bucket 5, and disposed near the upper edge thereof, are a number of openings 6 that are arranged in spaced relation with each other, and in a circular line, as clearly shown by the drawing.

The reference character 7 designates the ice compartment which is formed between the wall of the main bucket and the casing 8 which is shown as spaced therefrom. The casing 8 completely surrounds the main bucket section, the lower edge or bottom of the casing being extended inwardly and secured to the main bucket section as by welding or other suitable means. The upper edge of the casing 8 is in a line with the upper edge of the main bucket section, so that the cover used in closing the main bucket section, may also close the ice compartment.

The cover section which is indicated by the reference character 9, is disk-like in formation, and is provided with a downwardly sloping central portion 10 which is formed with a central opening, closed by the closure 11 which is hingedly connected to the cover section. The cover section also provides a support for the container 12 which is circular in formation, and constructed of wire mesh material, the container being provided with a bottom 13, so that the container will stand upright, when removed from the main bucket section.

A bail 14 is secured to the cover section, and affords means whereby the cover and container may be removed to facilitate filling the main bucket section and ice compartment, for use.

The reference character 15 designates the bail by means of which the minnow bucket may be readily carried.

It might be further stated that a latch member indicated at 16 is provided to maintain the closure 11 in its closed position, and prevent the water contained in the main bucket section, from slopping therefrom while the bucket is being carried or transported.

In the use of the minnow bucket, the minnows or live bait are placed in the container 12. The main bucket section is filled with water to the desired level. Ice is now broken into small blocks, and placed in the ice compartment 7. Since the wall separating the main bucket section from the ice compartment will become cold by its contact with the ice, it is obvious that the cold will be transferred to the water within the main bucket section, maintaining the water cool preventing to a degree, the lowering of the oxygen content of the water.

As the ice in the ice compartment melts, the water will find its way from the ice compartment, through the openings 6, into the water in the main bucket section. The passage of the ice water into the main bucket section tends to replenish the oxygen content of the water and renders the water in the main bucket section better adapted for maintaining the life of the minnows or bait, contained therein.

Due to the sloping of the cover section 9, it will be obvious that when the closure 11 is opened and the arm inserted in the container to remove the bait, any water which will be removed during this operation, will drain back into the container.

Since the ice compartment completely surrounds the main bucket section, and extends to a point near the bottom thereof, it will be obvious that the bucket will be balanced, and may be carried level, which of course facilitates the handling of the bucket.

What is claimed is:

1. A live bait bucket comprising a main bucket section, a casing surrounding the main bucket section in spaced relation therewith, providing an ice compartment, said bucket section having openings establishing communication with the ice compartment whereby water enters the main bucket section from the ice compartment, and a cover for the bucket section and ice compartment.

2. A live bait bucket comprising a main bucket section, a casing surrounding the main bucket section in spaced relation therewith providing an ice compartment, the bottom of the casing extending inwardly and having connection with the bucket section, said bucket section having openings establishing communication with the ice compartment near the upper end of said bucket section whereby water may enter the bucket section from the ice compartment, a removable container constructed of wire mesh material, positioned within the main bucket section, and a cover for the bucket section and ice compartment.

3. A live bait bucket comprising a main bucket section, a casing surrounding the bucket section in spaced relation therewith, and extending to a point adjacent to the bottom of the bucket section, the bottom of the casing extending inwardly and being connected with the bucket section, said casing providing an ice compartment with the bucket section, said bucket section having a line of openings adjacent to the upper end thereof, establishing communication with the ice compartment, a removable container constructed of foraminous material, a cover to which the casing is connected, said casing adapted to be positioned within the main bucket section, the cover closing the main bucket section and ice compartment, and a closure in the cover section permitting access to the container.

4. A live bait bucket comprising a main bucket section, a casing surrounding the main bucket section and spaced therefrom, providing an ice compartment, the bottom of the casing extending inwardly and having connection with the bucket section adjacent to the bottom of the bucket section, said bucket section having a circular line of openings formed therein and disposed at a point substantially one-fourth of the length of the bucket section from the top of the bucket section establishing communication with the ice compartment, a foraminous container adapted to fit within the main bucket section in spaced relation therewith, and a cover to which the container is secured, the cover being of a diameter to close the main bucket section and ice compartment.

5. A live bait bucket comprising a main bucket section, a casing surrounding the major portion of the main bucket section in spaced relation therewith, the bottom of the casing extending inwardly and having connection with the main bucket section, providing an ice compartment around the bucket section, said bucket section having openings establishing communication with the ice compartment, a container of foraminous material adapted to be positioned within the bucket, the container being spaced from the wall of the bucket, a cover to which the container is secured, the cover providing a support for the container, and said cover being of a diameter to close the main bucket section and ice compartment.

CALVIN GLENN HUBBELL.